Oct. 26, 1971   M. PILAO   3,614,826
METHOD FOR THE MANUFACTURE AND RECOVERY OF CONICAL
AND DISCS SETS FOR WOODPULP MACHINES
Filed Jan. 25, 1968   5 Sheets-Sheet 1

INVENTOR.
Milton Pilao
BY Michael S. Striker
Attorney

Oct. 26, 1971     M. PILAO     3,614,826
METHOD FOR THE MANUFACTURE AND RECOVERY OF CONICAL
AND DISCS SETS FOR WOODPULP MACHINES
Filed Jan. 25, 1968     5 Sheets-Sheet 2

INVENTOR.
Milton P. Pilao
BY Michael S. Striker
Attorney

3,614,826
METHOD FOR THE MANUFACTURE AND RECOVERY OF CONICAL AND DISCS SETS FOR WOODPULP MACHINES
Milton Pilao, Rua Campo Largo, 369, Sao Paulo, Brazil
Filed Jan. 25, 1968, Ser. No. 701,532
Claims priority, application Brazil, Nov. 23, 1967, 194,914
Int. Cl. B23p 19/00
U.S. Cl. 29—434　　12 Claims

ABSTRACT OF THE DISCLOSURE

In making comminutor sets for pulp refining machines, stainless steel or carbon steel sheet material is compacted to a given thickness to increase its hardness and tensile strength. Comminuting blades are made from the compacted material and welded to respective surfaces of the comminutor members of the set, employing a technique of ridgelessly welding in a skipping sequence to avoid raising the material temperature during welding above 200° C.

---

The present invention is directed to a new process for the manufacture of conical and discs sets for paper-pulp refining machines. The invention refers also to the recovery of said conical and disc sets when their blades are worn by use. The invention includes the conical and disc sets for paper pulp refining machines so manufactured and recovered.

The problems relating to the refining of paper pulp are very complex and of extreme importance to the final quality of the product, chiefly taking into consideration the diversification of the raw materials and the characterisics of the final product.

As it is already known, the purpose of refining the paper-pulp is essentially to proportionate to the fibrous material and adequate intimate structure as to the dimensions and fractional composition of the fibers, besides supplying to them a certain degree of hydration, on which depends the development of internal tensile strength bonding the fibers into a paper sheet or cardboard. From the association of such conditions it will obviously depend the degree of qualitiy of the final product obtained.

The processes and well known equipments for refining paper pulp have for principal objective to give to the raw material employed a complete treatment leading to the smashing and hydration of the fibers in order to turn them more flexible and more plasticized for a better contact among them inside the structure of a paper sheet or cardboard, thus increasing its bonding strength.

At the same tine, during the refining procedure, the cutting of the fibers takes place, turning them shorter. It is well known that, during a smooth refining of the stock it predominates the process of fiber hydration, while during an active refining action it predominates the cutting process with consequent shortening of the fibers.

It is generally known as being the coefficient of refining the ratio between the increase of hydration of the stock pulp expressed in degrees SR (Schopper Riegler) and the shortening of the medium length of the fiber, expressed in percentage of the initial medium length of said fiber. The smaller the cofficient is the stronger the refining action will be, while the larger the coefficient the smoother the refining action where hydration predominates.

As the characteristical basis of the type of paper to be produced depends chiefly on the preliminary operation of refining the stock, the refining machines should therefore supply these specifications in function of the raw material employed.

The refiners until now used to refine paper pulp are of the most varied types. Some of them seek the intensive cutting of the fibers, while others are made to avoid the shortening of the fibers, their main objective being the hydration of the stock.

Among the better known refiners and most widely used are the conical and disc refiners provided with cutting blades. These machines with blades have solved in great part the problems above appointed, as they permit the refining of stock in satisfactory conditions; with low specific pressure between the fixed and movable blades it predominates the beating action consequent hydration while high specific pressure hydration diminishes and the cutting action of the fibers increases.

It must be pointed out that the cutting action of the refiner, while keeping constant all the other variables, will depend essentially on the number of blades located on the rotating and fixed parts of the refining sets; the larger its number, the stronger will be the cutting action of the blades.

On the other hand, the hydration capacity of the refiners is according to the contact area of their active parts; it will be larger as much larger as that surface or contact area.

In the already known devices as above described, the stock fibers, passing through the active parts of the machine, suffer only in part its cutting and dehydrating action, because part of it passes without receiving any action at all. Measuring the degree SR of the stock at the outlet of the machine, we can verify that it is higher than the degree taken at the inlet of the machine. This increase of ratio depends on the number of fibers attained by the action and those that passed unattained. The ideal value of this ratio would be equal to 1, in which case all the stock fibers would have been attained and hydrated by the refiner action. It is well known and proved by experience that the number of fibers hit during a flow of the stock through the refiner will increase when the space between the blades is diminished.

In order to increase the efficiency when treating the stock it has been employed the use of repeated flows of the stock through the refiner, thus gradually diminishing the number of intact fibers and augmenting the degree SR of the stock during refining; however, this method has also its negative effects, as a large portion of the fibers would be attained too many times and this could even render useless the stock of pulp.

In view of the diversification of the raw material forming the pulp for the manufacturing of paper, cardboard, etc. and considering the variety of products that one has in mind to obtain, the refiners must present a very uncommon versatility to permit a fiber treatment according to the specific conditions required.

As stated above, the types of refiners more in use are the disc and conical refiners. The conical refiners are formed by a conical sleeve (stator) on the body of the machine and a conical rotor fixed on the main shaft supported by roller bearings which is powered by a motor. The disc refiners are constituted by two or more discs, being one fixed on the machine body and the others mounted on a rotating shaft.

Both the rotor and the conical stator, as well as the discs, are equipped with cutting blades, designed in the most varied shapes, depending on the desired conditions of the pulp treatment in function of the raw material.

However, all the above mentioned types of refiners equipped with steel blades present serious restrictions and inconvenience that limitates its wider and more efficient use. When its steel blades are worn by the constant use in refining, the cones and discs become irrecoverable by the conventional techniques of their manufacture, thus causing the loss of about 70% of the special and expensive steel used in the manufacture of the refiners, as the total weight of the blades is nearly 30% of the refiner weight.

In both types of the above mentioned refiners, the blades are disposed in various positions, such as angularly, spirally, longitudinally or radially, to propel the pulp stock through the conical rotor or stationary and rotating discs. To provide the necessary pressure on the pulp flow, there are located between the blades a number of grooves and retainers, which provoke the smashing of the raw material and the cutting action on the fibers.

The design and position of the blades over the surface of the discs or cones, as well as their thickness and height, must be adequate to the kind of raw material employed and the type of treatment that the pulp needs for a desired objective, sometimes demanding a larger cutting action or a predominant hydration of the fibers.

Usually, the conical or disc sets of the refiners are made from foundary cast of steel alloy. During the foundry operation of such parts, the cones and discs are directly provided with blades. The sets thus obtained show serious inconveniences and disadvantages caused by the foundry, as follows: in first place, is to mention the high loss of material due to the total unprofit of the discs and conical pieces caused by the wear of its blades, which turn them irrecoverable losing by this way about 70% of the steel used in the manufacture of the refiner. In second place, we can still mention the undesired characteristics imparted to the steel used in the manufacture of the refiner, chiefly in its blades when obtained from the foundry operation. Even if the technical specifications of the steel are the best before the foundry, the steel parts and chiefly the blades lose their desirable qualities or resistance, flexibility and anti-corrosiveness, after being cast in the foundry, becoming of porous consistence, easy to break, extremely hard and not flexible.

As already mentioned, the forms of treatment of the paper pulp are extremely varied, now demanding a cutting action on the fibers, then demanding the maximum length of fiber, together with a desirable hydration action. Consequently, it must be also varied the number, dimensions and positions of the blades on the discs and cones.

To allow substantial friction over all the fibers, between the surface of the rotor and stator blades or the stationary and movable discs, and consequent crushing for hydration or cutting, the blades are to be provided in adequate conditions, straight or in angle, or in creepy course, the channels formed between them being either continuous or discontinuous, in order to force the stock through them and accomplish the refining action; narrow channels and higher and thinner blades being often needed.

The above mentioned conditions and other desirable ones, however, cannot be achieved satisfactorily by the foundry techniques; the difficulties of this operation increase at the same time as increases the specified exigence relating to the blades and channels space, as well as those relating to the retainers or grooves driving the flow of the stock.

As mentioned, the best conditions for pulp treatment, in certain circumstances, require a large quantity of narrow blades covering the whole surface of the rotor, the stator and the discs.

The moulding of these parts, however, is very difficult, as it would be impossible according to the actual techniques, requirements, to cast at the same time a part provided with relatively high blades closely spaced between them.

Finally, as an additional serious disadvantage resulting from the casting of this type of refiner sets, it can be mentioned the necessity to employ a large and expensive number of casting moulds, in order to attend the demand of the market, not mentioning that every type of paper requires a special treatment and the quality of the pulp indicates a different method of operation. Therefore, for every group of factors, is necessary a special type of refiner as concerns the configuration, dimensions and spacing of blades. A standard type of refiner or a limited number of types would not solve the problem, due to the large variety of factors involved in the pulp treatment.

Attempts have been made to solve the problem, but it is useless to describe them as, in a general way, they have failed.

Just to state an example, it has been tried to manufacture disc sets for refiners by means of slot-cutting machine instead of by foundry. This process, however, is fundamentally expensive, not only as regards the operation itself, but also because of the large waste of the expensive material employed.

An object of the present invention is therefore to provide a new process for the manufacture of conical and disc sets of paper pulp refiners, by means of which all the disadvantages of the processes used up to now may be removed. Another objective of the present invention is a process, in which the blades applied to the conical and disc sets of refiners are prepared in order to assemble the best characteristics needed for every requirement, and maintain them during the manufacture of refining sets in conditions never before performed by the conventional methods of foundry. Still another objective of the present invention is to supply a process as above described, in which the foundry of the parts is totally abstracted, in order to surmount all its inconvenience, which are extremely harmful to the refiner set, and the technical limitations deriving from the application of that method.

Still another object of this invention is to provide a process, permitting the total recovery of the cones or discs of refiners sets the blades of which have been worn by the constant use.

Another objective of the invention is to provide new and improved set of cone and discs for paper pulp refiners, manufactured or recovered after the wear of its blades, which present physical characteristics never before obtained in such types of machines; also showing a really surprising versatility in order to adapt themselves to the extreme variety of the market requests and conditioned to the type of paper required to be produced, as well as to the quality of the pulp to be treated.

Other objects of the invention, its scope and its real advantages will be better understood following the description below and accompanying drawings:

With reference to the drawings, the invention is essentially shown as a new process of manufacture and recovery of conical and discs sets for pulp refining machines.

Taking firstly into consideration the process of manufacture of said sets, the first stage is the preparation of the rotor, the stator and the disc set, starting from laminated stainless steel or carbon steel.

Figures 1, 2, 3, 4, 5:
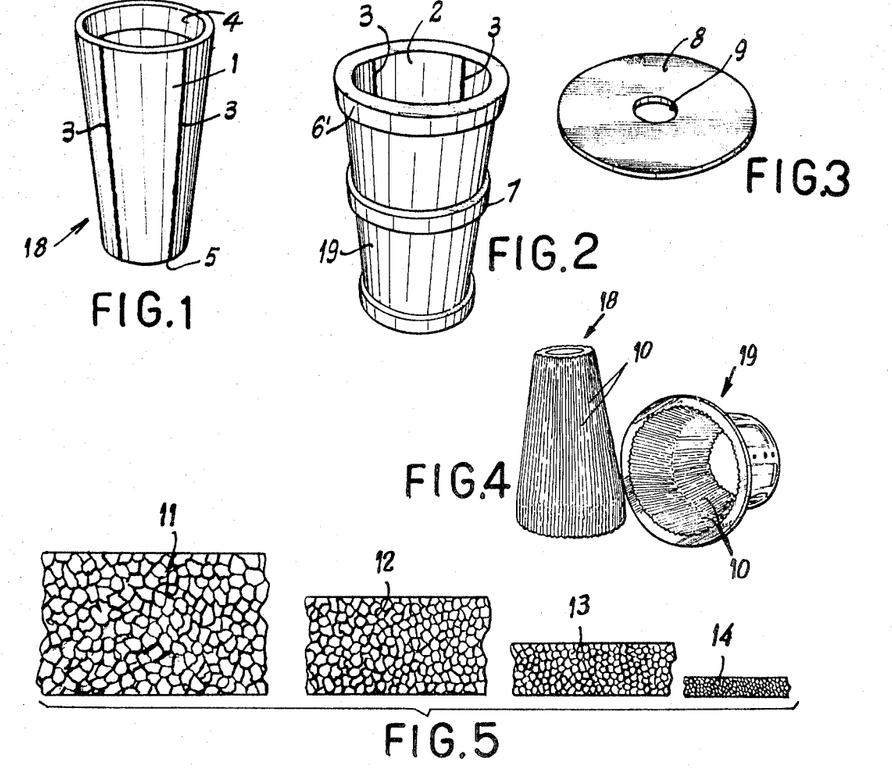
FIG. 1 is a perspective view showing a rotor prepared to receive the blades of the refining set, according to the present invention.
FIG. 2 is a perspective view showing a stator also prepared to receive the said blades.
FIG. 3 is a perspective view showing a disc ready to receive the blades.
FIG. 4 is a view showing a rotor and a stator set worn by the use in a refiner, in conditions to be recovered through the method of this invention.
FIG. 5 is a schematic cut view of the blades used in conical and discs sets of refiners, according to the present invention, showing phases of their preliminary treatment.

For the manufacture of the rotor and the stator, as shown on FIG. 1 and 2, are utilized the steel plates twisted in frusto-conical shapes constituted by conical segments 1 and 2, respectively, which are then secured by a seam welding 3, forming a conical body. In order to keep the shape of the conical parts and to prevent its deformation during the subsequent operations, removable rings 4 and 5 are internally provided at the edge of the rotor 18, and reinforcement external rings 6 and 6' at the edges of the stator 19, besides intermediate rings 7 on stator and 7' on rotor, FIG. 19.

These rings are afterwards machined and are useful to support the set for mounting it on the refining machine.

The discs 8 of stainless steel or carbon steel are equally cut in crown-shape, either in one piece or in segments that are afterwards welded together, FIG. 3, and are provided with a central opening 9.

These discs, in order to keep its shape and avoid deformations during the following operations, are united together in inverted positions, by means of any adequate process, as for example welding points, for further removal.

Realizing the manufacture of the cones and discs according to the present invention, by means of steel rolled sheets twisted in the required shapes, without being submitted to any undesirable thermical action, the parts so obtained are technically superior to any others produced by casting means.

They are more perfect and present no internal strengths as those obtained by foundry, besides not being subject to leak or present lack of uniformity on its walls.

These sets of stainless steel or carbon steel, produced through the process of the present invention, are in addition able to support a larger number of recovery operations, due to the resistance of its construction, what represents a great advantage over the conventional articles.

The conical or discs sets already worn by use, as shown on FIG. 4, the blades 10 of which are practically useless due to abrasion, can have their body, which represents about 60 to 70% of the total weight of the steel employed, recovered according to the present invention; the carcass is submitted to lathe-turning operation in order to eliminate by wear-off the fragments of blades still appearing on its surface, thus obtaining completely smooth and uniform surfaces in the desired gauges.

After this, the conical and disc sets so recovered also receive the reinforcement rings, as indicated in the manufacture of the original sets.

The bodies of cones and discs, with its surface duly machined and reinforced are now ready to receive the blades, acting as teeth, which are prepared as follows.

The material employed to prepare these blades is stainless steel alloy or carbon steel, or preferably, an alloy of stainless steel and nickel-chrome.

An alloy of stainless steel particularly indicated for the manufacture of the blades has the following composition:

| | Percent |
|---|---|
| Chrome | 17–19 |
| Carbon | 0.07 |
| Phosphorus | 0.07 |
| Nickel | 7–9 |
| Manganese | 1 |
| Sulphur | 0.03 |
| Copper | 2–3 |
| Silicon | 1 | and other noble impurities.

Evidently, the composition of this alloy is given in order to better illustrate the invention, as other alloys of the same type may also be used.

This material, however, although noble in its composition, do not present physical characteristics capable of supporting the refining work with good performance and durability, because its maximum hardness is 200 Brinell and the tensile strength is about 70.7 k.g./mm.$^2$. It is therefore an essential feature of this invention the pre-treatment of the stainless steel bars, in the above or similar composition, to improve its physical properties, in order to become suitable for the desired purpose. This step consists in compacting stainless steel bars of a determined thickness, reducing these bars to a fraction of its original thickness, by means of a cold-rolling operation performed, alternating the bars on the rolling-mill, in order to avoid the superheating that would harm their intimate structure.

By means of said cold-rolling, the bars or plates acquire a degree of hardness of about 400° Brinell, increasing at the same time its tensile strength to about 140.4 kg./mm.$^2$, thus becoming particularly adequate for manufacturing pulp refiners, by avoiding premature wear, breaking and leaking.

FIG. 5 shows schematically the effect of cold-rolling on stainless steel bars with the above composition, in successive phases, starting from a material of about ⅝" of thickness (11) through several phases (12, 13) till reaching a thickness of less than ⅛" (2 millimeters).

Figure 6:
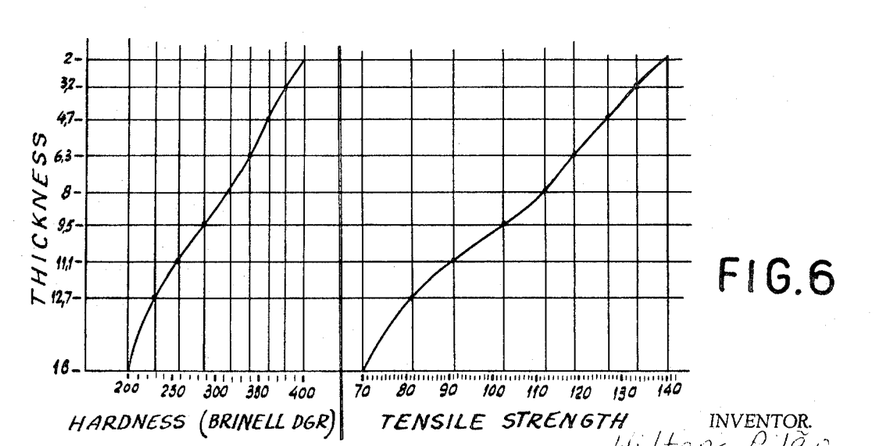
FIG. 6 is a graphical chart indicating the variations of hardness and tensile strength obtained by the pre-treatment of said blades through cold-rolling, according to the present invention.

The graphic at FIG. 6 shows the values corresponding to hardness and tensile strength of said blades, the thickness of which was reduced from ⅝" to 2 mm. One can see on this graphic, which is the result of very careful measurements, that the material having initially very weak physical characteristics for the purpose in mind, i.e., about 200° Brinell of hardness and about 70.7 kg./mm.$^2$ of tensile hardness of 400° Brinell and a tensile strength of 140.4 kg./mm., without affecting its flexibility, being thus completely satisfactory for refiners sets.

This treatment, that improves substantially the qualities of the material, leads to a real molecular compactness, until reaching the limit of flexibility and resistance.

The mentioned conditions, performed according, to the present invention, cannot be compared to the hardness obtained through the foundry of the refining elements, by the conventional casting methods, and this because the molded material is formed in thermical conditions that turn it extremely stiff, unflexible and breakable, as well as presenting large porosity chiefly on the surface of the blades.

Figures 7, 8, 9, 10:
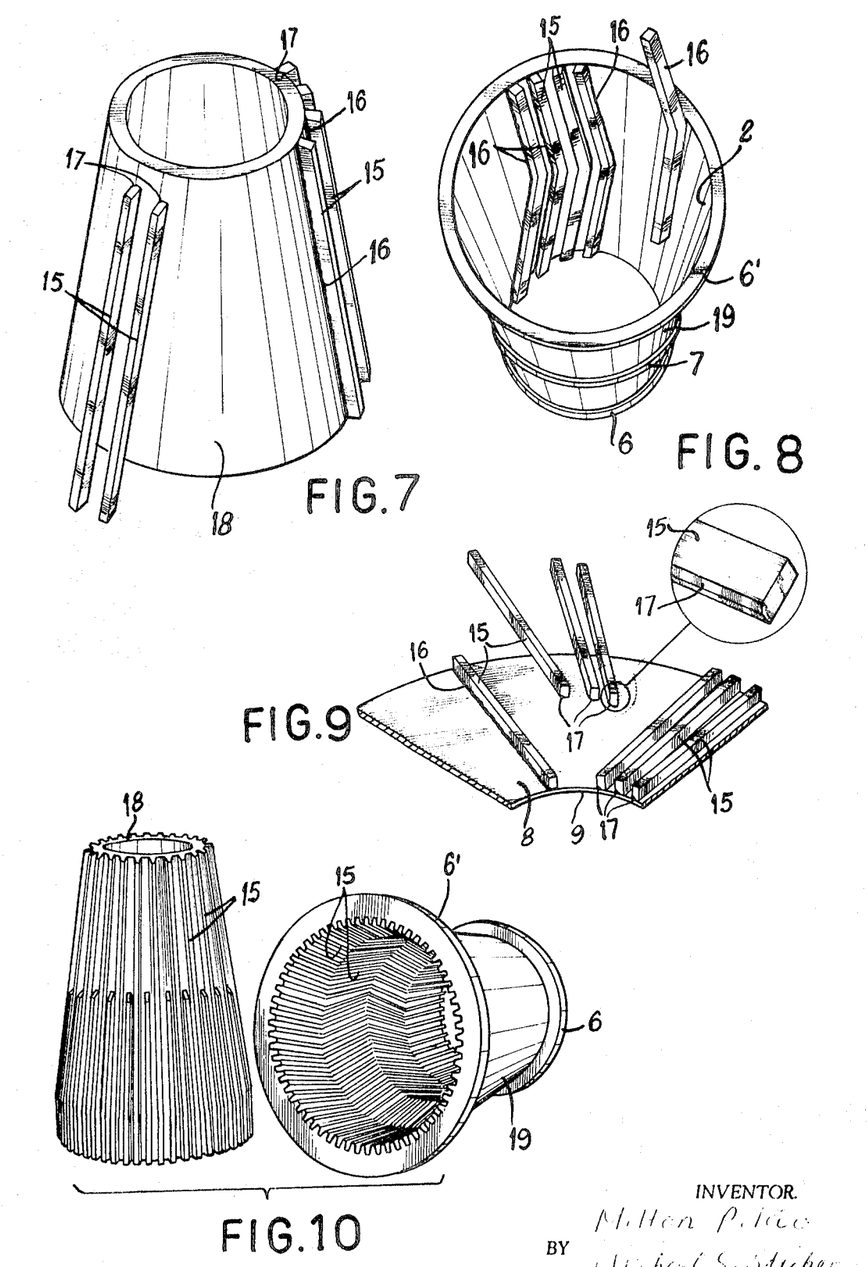
FIGS. 7, 8 and 9 are perspective views showing the operation of blade insertion respectively on a rotor, on a stator and on a disc by means of welding, according to the present invention.
FIGS. 10, 11 and 12 are perspective views showing the position of the blades on conical rotors and stators, in varied patterns and varied dimensions, thickness and distance.

The next step of the process, according to the present invention, consists in applying on the machined surfaces of the bodies of the conical and discs parts, the blades 15 of stainless steel or carbon steel previously submitted to the cold rolling treatment (FIGS. 7 to 9).

In a preferred way, this application is made by means of electric welding, with electrodes of the same material of the blades, in order to form a simple ridge welding 16 as shown on FIGS. 7, 8 and 9, or alternatively by double welding, always in conditions perfectly controlled by operations and temperature, to avoid deformation or heataction on the molecular constitution of the material.

To realize this, the cones or discs, held in its gauges by the reinforcement rings already mentioned, will receive on the desired places and distances the blades duly prepared and compacted, which are welded in its positions over the corresponding plain surfaces of the cones and discs of the refiner in a skipping way, in order to avoid areas of unequal heating, so that the material employed may keep a temperature not exceeding 200 degrees centigrade.

For a better ridgeless welding, the lower edges of said blades which stay in contact with the surfaces of the cones the discs are sloped, as shown on 17. FIG. 7 shows the application of the blades, just as teeth, on a rotor. FIG. 8 shows same operation on a stator, and FIG. 9 on a disc partially shown.

As soon as the welding operation of the blades is completed, the parts with its blades already fixed are submitted to tests of leakage, tortion, and flexion, directly on their blades by means of special machines. These tests will determine the conditions of fusion between the blades, the electrodes and the material of the refiner bodies. After these tests, which are necessary for the good result of the process, the cones and discs are submitted to a final machining of the blades surfaces. In sequence to this operation, the conical or discs basis are submitted to a cleaning of the channels between the blades, by means of sand-jet, in order to eliminate any projection or irregularity provoked by the fusion of materials during the welding operation. Finally the rotor, which is always rotating against the stator or stationary element of the refiner, and the rotating discs which work against the stationary discs, are submitted to a dynamic balancing that attains about 3600 r.p.m.

It is obvious that all the above described operations of applying the blades on the smooth surfaces of the cones and discs manufactured according to the present invention, will also be employed in the same sequence and technical operation to the bodies recovered as above; the only restriction is that the discs originally manufactured by foundry are of difficult recovery, due to its hardness and lack of flexibility, while the discs manufactured according to the present invention can be recovered several times, thus saving 60 to 70% of the material employed.

Contrary to the usual process of foundry, the new process according to the invention permits that the position and dimensions of the blades of refiners may attend to the most exigible and specific demands of the paper industry, either to the nature of the stock or to the quality of the final product desired.

Figure 11:
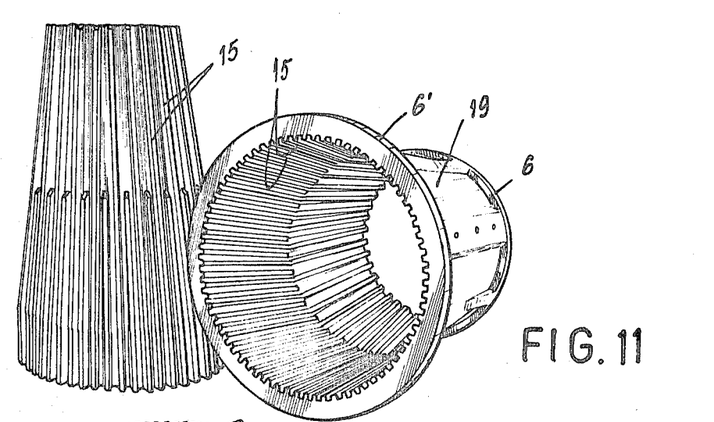
Figure 12:
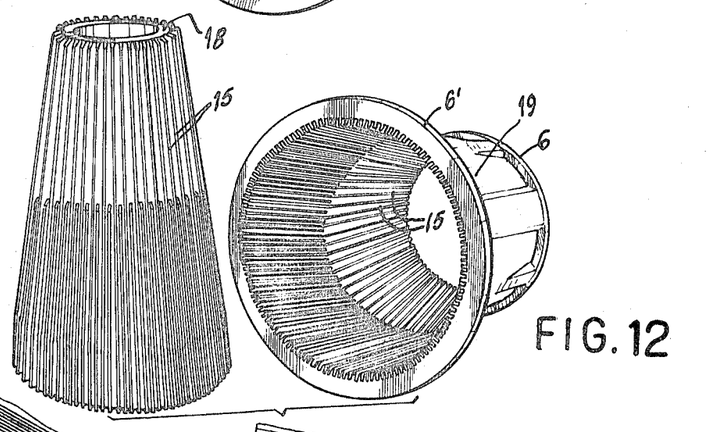
Figure 13:
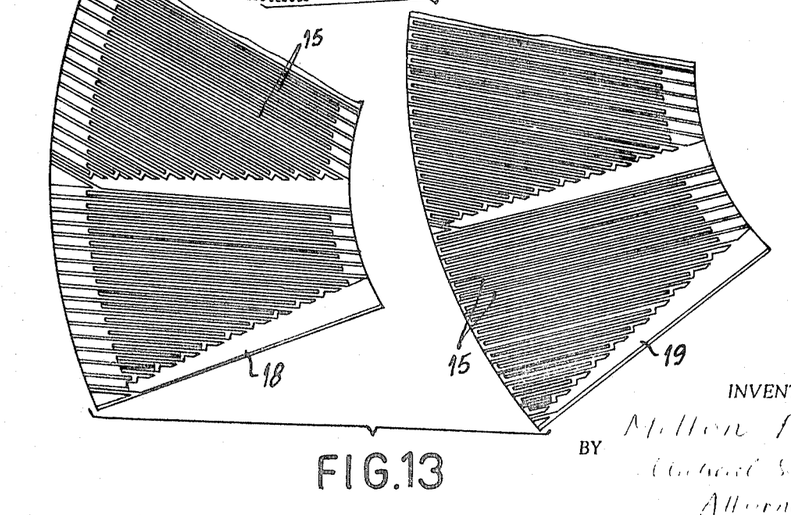
FIG. 13 is a schematic view of a closed system of blades insertion on a conical rotor and stator.
Figures 14, 15, 16, 17:
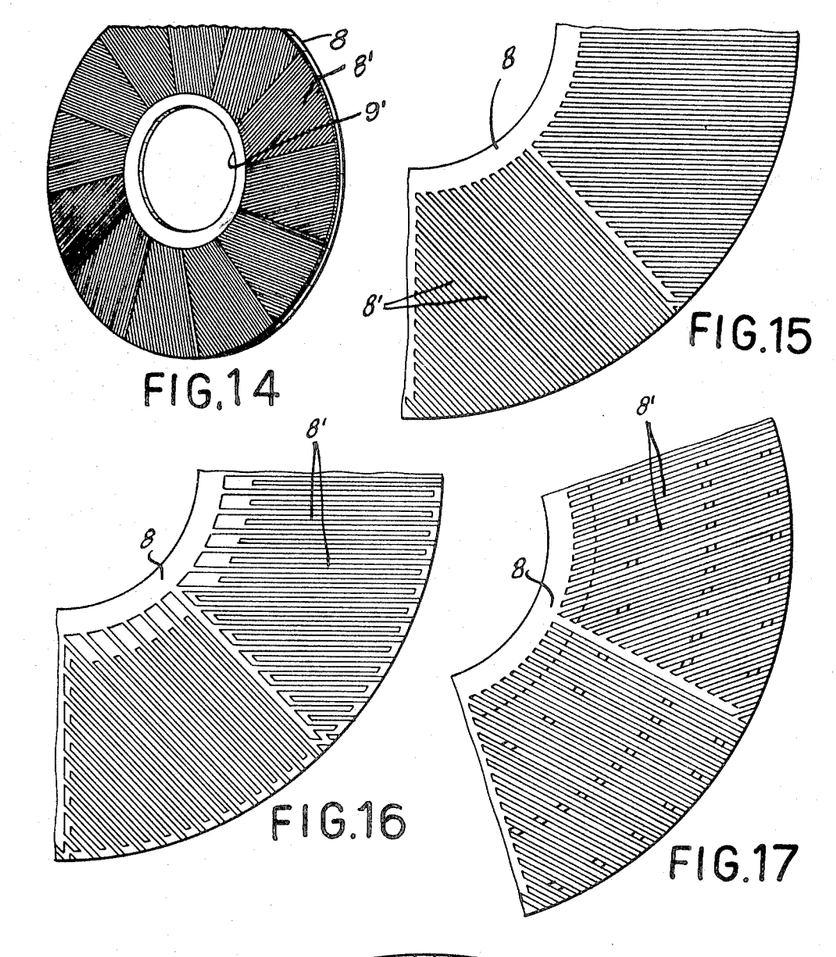
FIG. 14 is a fragmentary perspective view showing a refining disc already equipped with blades, according to the present invention.
FIGS. 15, 16, 17 and 18 are schematic views showing the variable position in configuration and dimension of the blades inserted on the refiner discs, as above described, either in open system or in closed and interrupted systems.
Figure 18:
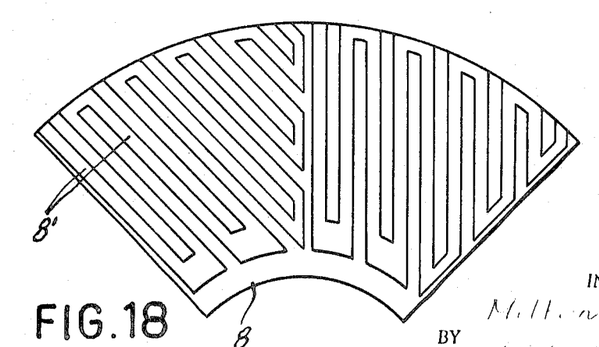

FIGS. 10, 11, 12, and 13 show the versatility in which can be manufactured the conical refiners, from the insertion of blades of minimum thickness and with minimum space between them (narrow channels) as in FIG. 12, to the insertion of blades of larger thickness and more spaced in FIG. 11. The said blades can also be inserted in open systems as in FIGS. 10, 11 and 12 or closed systems as in FIG. 13, and still the channels formed between the blades can be equipped with intercepting gaps or flow-detectors in order to force the stock to transpose a blade when passing to the subsequent channel.

FIGS. 15, 16, 17 and 18 show different pattern of the discs by the suitable insertion of blades, 8' in open or closed systems, with varied thickness and separations, according to the requirements of the paper industry.

Figures 19, 20:
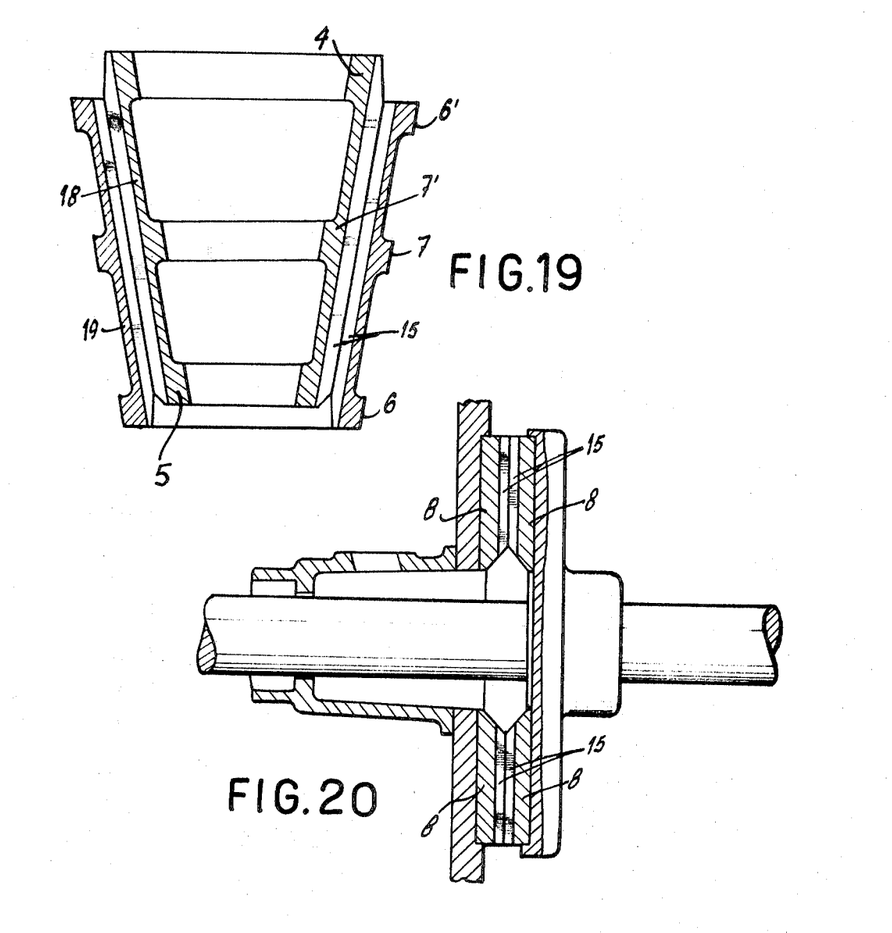
FIGS. 19 and 20 show, in diametral and schematic cutting, a conical refiner set and a disc refiner set, respectively, comprising the rotor, the stator and the discs, manufactured or recovered in accordance with the present invention.

FIGS. 19 and 20 show schematically, in diametral cutting, a conical refiner and disc refiner, indicating their assembly on the machine. As shown FIG. 19, the refining set comprises two conical elements co-axial mounted, being the internal 18, rotative, denominated "rotor" and the external 19, fixed, called "stator," both inserted with blades 15. The stator 19 presents a flanged edge or rings 6 and 6', the rotor being also equipped internally of rings 4 and 5. Reinforcing rings 7 on stator and 7' on rotor are also provided externally and internally, respectively.

The operation of the refining machine of said type, as already known, is based on the fact that the stock is directly introduced, under desired pressure, among the blades of the refiner, suffering its cutting, crushing or hydrating action, being then finally extruded by the movement imposed to the rotor or rotating discs against the stator and stationary discs, respectively expelled at the opposite end of the machine.

The flow of the pulp through the refinery gap is repeated as many times as it is necessary to obtain the desired results.

The advantages shown by the refiners equipped with sets of cones and discs according to the present invention are evident, all of them deriving from the new process of manufacture and recovery. In addition to the above mentioned advantages over the conventional refiners, the following are also to be mentioned:

ECONOMICAL ADVANTAGES

At first, it could seem that the application of the blades, acting as teeth, over the surfaces of the rotor, stator or discs, through an individual process, would be more expensive than the simple foundry of the parts. It is true that for the manufacture of a single pattern of refiner, the operation of manual insertion of the blades would be more expensive than the operation of foundry. However, considering the varied form of patterns and moulds that would be exigible for the manufacture of cast parts of several types, to attend the kind of pulp required and the types of paper to be made, the process according to the present invention presents clear economical advantages.

In addition, one has to point out that this new process permits the recovery of nearly 70% of the steel employed in the construction of the refiners, recovery that would be impossible on parts made through the method of foundry. Therefore, according to the above explanation, one can reach the conclusion that the process of the present invention offers clear and undiscussed economical advantages when compared to the process of foundry.

TECHNICAL ADVANTAGES

Among the technical advantages offered by the method of this invention, it must be firstly stressed that the durability, the resistance to wear and the tensile strength of the blades inserted on the refiner, over the parts made by foundry, is improved by 50%.

This unpredictable and surprising result was obtained after long and repeated research, decurring from the following facts:

(a) special characteristics of the stainless or carbon steel alloy, preferably, nickel-chrome alloy, used to start the manufacture of the blades.

(b) compaction by cold-rolling of the sheets of larger thickness, in order to obtain sheets of very little thickness having a hardness of 400° Brinell and a tensile strength of 140 kg./mm.$^2$, without losing its flexibility.

(c) individual application of the blades for instance by ridge welding in controlled conditions of temperature and operation, thus avoiding the harmful alterations that happen on materials produced by foundry, which become breakable, porous, and corrisive, not resistive to the conditions faced in the refining operation.

Figure 21:
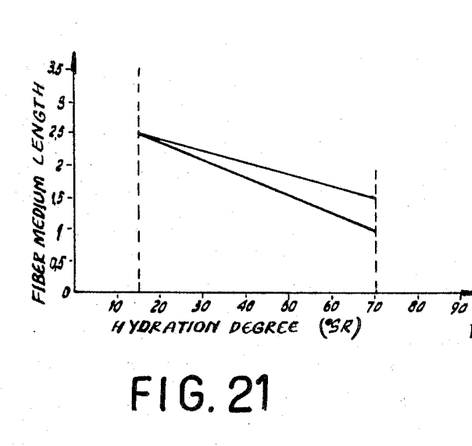
FIG. 21 is a graphic chart representing the changes of the fiber medium length and the degree of stock hydration during the process of refining with conventional equipment.

Still another technical advantage flowing from the process of the present invention is the large versatility of the refiners thus manufactured. To well prove this fact, FIG. 21 shows a graphic that mentions the ratio between the fiber medium length and the degree of hydration of the stock, during the process of refining through the conventional refiners in use.

One can see on the graphic that there is an almost constant relation between the cutting and hydration, variable only within a limited extension due to conditions of pressure, flowing, and others. However, the demands of the paper industry are extremely varied in function of the final product desired and the nature of the stock pulp; this variety of demand reflects in the characteristics that the refiner should present, now producing a deep hydration and limited cutting of the fibers, then producing little hydration and deep cutting. Considering these facts and the nature of the stock, from thinner to thickest, the refiners sets of cones and discs should offer also the possibility of wide variations, to meet all of required working conditions.

Through the process of the present invention, the blades can be inserted on the refining sets in any required pattern i.e., on straight line, in angle, forming continue or discontinue channels and principally the most impressive change of dimensions is allowed.

If their thickness is very small and the space between them very little, and large their number, the contact area will be consequently larger on the refiner parts, thus conditioning the quality of the refining to the required demands of production, avoiding the technical and economical inconvenience of re-flowing the stock several times through the refiner.

According to the present invention, there are no technical limitations to insert the blades on the refiners, for much thin as they are or small their spacing, or also for much high as they are.

The application of the blades can be performed either in the manufacture of new sets or when they are recovered after being worn out. This, however, is not the case when the sets are made conventionally by casting method, as the limitations of that process do not permit the moulding of parts outside certain patterns exigible by the paper industry.

Contrary to the method of foundry, the process according to the present invention permits the construction of refiners in a large number of types and dimensions, thus adapting completely to the demand of the industrial techniques, freeing the conditions of cutting from the conditions of hydration, in order to produce a pulp which fibers are according to the type of paper to be produced; this can only be achieved by a variation of the contact area and the number and configuration of the blades.

The process according to the present invention attends promptly to these demands, in contrast to the conventional method of foundry, which has serious limitations.

PERFORMANCE

The performance of the refiners manufactured according to the present invention is more ample than the one obtained with the conventional refiners made by foundry, the requirements of which do not permit the realization of a sufficient contact area for the production of considerable quantity of pulp. For their own characteristics, the performance of refiners made according to the present invention is nearly 30% above that of the conventional refiners, and still larger in the sets made with very thin blades and small space between them. In this way the larger the number of blades, the larger will be the number of fibers refined, thus the refining index of the stock will also be higher, avoiding the expensive method of recycling the stock through the refiner.

What I claim is:

1. A method of making comminutor sets for pulp refining machines wherein two comminutor members have respective juxtaposed surfaces provided with elongated projecting blades and are displaceable with reference to each other, said method comprising the first step of making two of said members each having an exposed surface; the second step of providing a sheet material composed of stainless steel or carbon steel having a first level of hardness and tensile strength, and a thickness greater than that required for said blades; the third step of compacting said sheet material for thereby reducing its thickness to that required for said blades, while concomitantly raising said hardness and tensile strength to a higher second level; the fourth step of subdividing said sheet material into blades of requisite size and shape; and the fifth step of permanently affixing said blades to said surfaces without decreasing said hardness and tensile strength from said higher second level thereof, said fifth step comprising ridgelessly welding said blades to said surfaces in a desired pattern and in skipping operational sequence so as to maintain during welding a uniform and low temperature not surpassing 200° C.

2. A method as defined in claim 1, wherein said blades are of stainless steel and are longitudinally sloped over the entire length of their respective welding edges.

3. A method according to claim 1, wherein the spacing between the blades and their thickness may vary within wide limits in order to allow the variation of the number and dimensions thereof depending on the course of the refiner, on the conditions of the pulp and on the nature of the paper required.

4. A method as defined in claim 1, wherein said fourth step is carried out prior to said third step.

5. A method as defined in claim 1, wherein said third step comprises cold-rolling said sheet material.

6. A method as defined in claim 1, wherein said first step comprises making a pair of disk-shaped members each having one of said exposed surfaces.

7. A method as defined in claim 1, wherein said first step comprises forming a rolled sheet of stainless steel or carbon steel to the shape of a hollow conical first member having an internal exposed surface, forming a rolled sheet of stainless steel or carbon steel to the shape of a conical second member receivable with clearance in said first member and having an external exposed surface, and securing reinforcing rings to said first and second members at the exterior and the interior thereof, respectively.

8. A method as defined in claim 6, wherein said first step comprises making said disk-shaped members from rolled sheets of stainless steel or carbon steel, and providing each of said members with a central mounting opening.

9. A method as defined in claim 1, wherein said sheet material is nickel-chrome alloy stainless steel.

10. A method as defined in claim 1, wherein said third step comprises subjecting said sheet material to repeated cold-rolling while maintaining it against any temperature increase.

11. A method as defined in claim 10, wherein said sheet material has an initial thickness of substantially 16 mm., and wherein said third step comprises compacting said sheet material and reducing the thickness thereof to substantially 2 mm.

12. A method as defined in claim 1, wherein said fifth step comprises placing said blades onto the respective exposed surface, and electrically welding said blades with the help of a stainless steel electrode to the respective surface.

(References on following page)

References Cited

UNITED STATES PATENTS

| | | | |
|---|---|---|---|
| 45,854 | 1/1865 | Parr | 72—365 |
| 180,403 | 7/1876 | White | 72—365 |
| 341,084 | 5/1886 | Whitney | 72—365 |
| 611,324 | 9/1898 | Johnston | 72—365 X |
| 349,332 | 9/1886 | Anderson | 241—293 |
| 1,560,743 | 11/1925 | Van Buskirk | 241—293 |
| 2,871,769 | 2/1959 | Prevost | 241—293 X |

OTHER REFERENCES

Metals Handbook, vol. I, 8th edition (1961), pp. 411 and 412.

JOHN F. CAMPBELL, Primary Examiner

D. C. REILEY, Assistant Examiner

U.S. Cl. X.R.

29—401, 498, DIG 32, DIG 48; 72—365; 241—293